J. P. DOVEL.
ORE WASHING PLANT.
APPLICATION FILED SEPT. 28, 1915.

1,252,414.

Patented Jan. 8, 1918.
3 SHEETS—SHEET 1.

Witness
J. Gordon Sparkes

Inventor
James P. Dovel
By
R. S. Johnston Jr.
Attorney

J. P. DOVEL.
ORE WASHING PLANT.
APPLICATION FILED SEPT. 28, 1915.
1,252,414.
Patented Jan. 8, 1918.
3 SHEETS—SHEET 2.
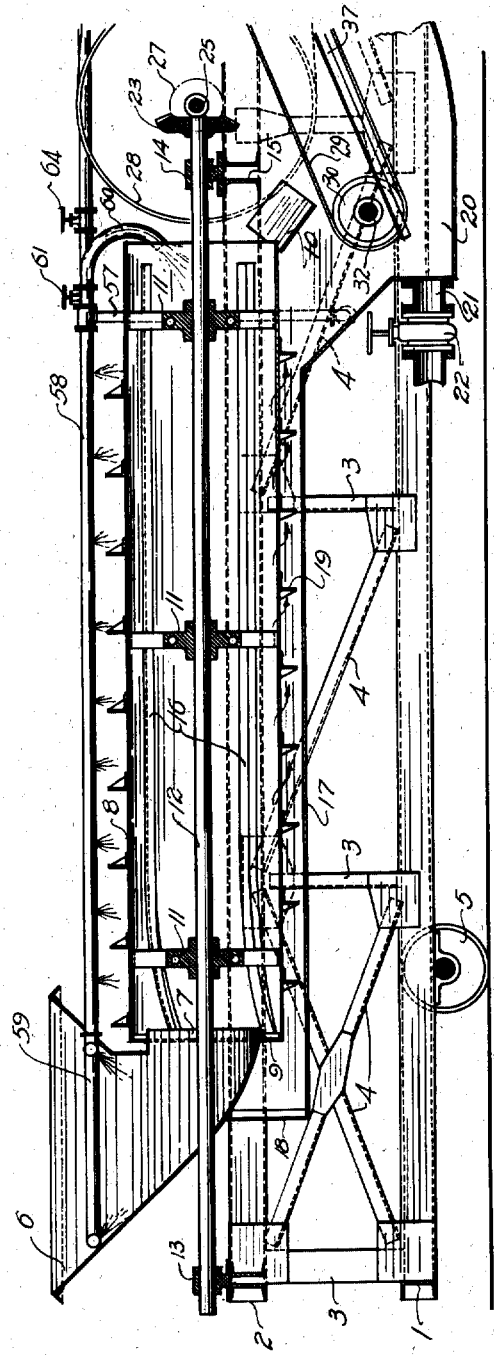
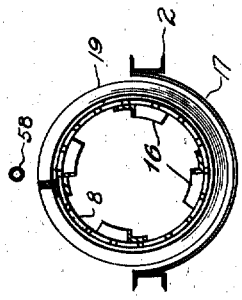
Inventor
James P. Dovel
Witness
By
Attorney

J. P. DOVEL.
ORE WASHING PLANT.
APPLICATION FILED SEPT. 28, 1915.

1,252,414.

Patented Jan. 8, 1918.
3 SHEETS—SHEET 3.

Witness
J. Gordon Sparks

Inventor
James P. Dovel

By
Attorney

UNITED STATES PATENT OFFICE.

JAMES P. DOVEL, OF BIRMINGHAM, ALABAMA.

ORE-WASHING PLANT.

1,252,414. Specification of Letters Patent. Patented Jan. 8, 1918.

Application filed September 28, 1915. Serial No. 53,116.

*To all whom it may concern:*

Be it known that I, JAMES P. DOVEL, a citizen of the United States of America, residing at Birmingham, in the county of Jefferson and State of Alabama, have invented certain new and useful Improvements in Ore-Washing Plants, of which the following is a specification.

This invention relates to improvements in washing plants for ore and other minerals.

As my invention is peculiarly adapted for the washing of ore and particularly brown ores, its objects may be better understood by a brief statement of the present practice in reference to the mining and washing of these ores. Brown ores are generally found in a deposit of clay and they are mined by hand or steam shovels and the clay and ore are transported from the different pits to a central washing plant where a separation of the clay from the ores is effected in two steps. The first step is to pass the clay and ore under a water spray through a conical rotating screen having large diameter openings, say three inch, which separates the larger lumps of clay and ore from the body of the material. The lumps are passed to a picking belt and the screened material is delivered to a log washer consisting of a central shaft of large diameter having spirally disposed thereabout a series of paddles which force the ore and clay upwardly along an inclined trough and against the flow of water therethrough. The material after treatment in the log washer is delivered to a picking belt where the larger lumps of clay are picked and thrown off but the smaller lumps or balls of clay that have not been eliminated in the log washer, pass off with the finished product and materially depreciate its value.

The first objection which I have found to the present practice is that it necessitates the provision of a large and expensive central washing plant and the transportation to this plant of all of the excavated material of which only a small percentage is ore. I have therefore conceived that a material economy in operation will result from the production of a light, compact and portable washing plant which is so inexpensive that one may be placed at each of the large pits and there operated to clean the ore so that only the finished product needs to be transported. As this arrangement involves problems in connection with the supply of water to the washers, it has been necessary to design a washer which is especially adapted to obtain results of the highest efficiency with a minimum supply of water. To meet these conditions, it must be understood that the excessive water requirements for log washers arise primarily from the fact that according to the principle of their operation the elimination of the clay must be effected by the flow of water and therefore a large volume is required, especially where the whole clay eliminating operation is performed in the log washer. Moreover the design of the log washers is such as to interfere with the elimination of the clay by the flow of water, due to the fact that having the paddles working in a trough, it is necessary to have an end wall which maintains the required water level in the trough and makes a pool through which the clay lumps must be carried by the flow of water. To overcome these disadvantages I propose to utilize the flow of the water for effecting only the final washing of the ores and I have provided an apparatus which practically reverses the method of operation of the log washer and enables me to accomplish my ends with a comparatively small flow of water. According to this phase of my invention, I provide what I term an internal washing drum formed of an unperforated cylinder open at its ends and provided with an internal continuous spiral rib which serves as a force feed to move the material therethrough against the flow of the water. The first thing to be noted in this connection is that the rotating drum and spiral rib will give a rolling action to the material which will naturally by gravity bring the clay and lighter material to the surface and that the cylindrical shape of the drum will concentrate a comparatively small stream of water as it flows lengthwise therethrough so that in flowing over the successive convolutions of the rib, it will wash or roll along with it the small balls of clay which are rolled to the surface of the material. The lower end of the drum being left open, there is no pool provided there and the water, clay and sludge have a free and unobstructed discharge. I have found that the efficient action of the washing drum is materially increased by the provision of means to preliminarily treat the ore and clay so as to eliminate the larger lumps of clay and to deliver only to the washing drum material in such condition that its washing can be completed therein with a small flow of water. If the whole volume of material should be preliminarily delivered into the washing drum and the flow of water relied upon to wash it, it would require a very considerable flow of water and such a flow of water would have the very disadvantageous result of carrying off with it a valuable percentage of small ore. According to my invention for preliminarily washing the ore, I take the material as delivered to the washer and pass it through a washing screen having small perforations which prevent the loss of the fine ore and having preferably internal ribs which serve to break up the lumps of clay. The washing treatment in the screen separates practically all of the fine clay and delivers the ore and lumps of clay to a picking belt in such condition that all of the large lumps of clay and rock can be picked out. The material, after it has been thus picked on the belt, is delivered into the lower end of the washing drum. Where my apparatus is mounted on a wheeled support it is of advantage to dispose it with a view to economize space and to this end the screen and drum washers and the belt are disposed in alinement and a common sludge tank is provided beneath the belt and in position to receive the sludge from both washers. It is also of advantage that this sludge tank be underhung so as to bring down the level of the charging hopper and to cause the drum washer to have the desired angle for operation and at the same time to discharge the washed material at a proper height for falling into cars or lorries.

My invention further comprises the several novel features of construction and arrangements of parts which are hereinafter more particularly described in their preferred embodiment only, reference being had to the accompanying drawings which illustrate such preferred embodiment, and in which:—

Fig. 3 is a vertical section on the line 3—3 of Fig. 1.

Fig. 5 is a cross sectional view of the screen washer taken on the line 5—5 of Fig. 1.

Similar reference numerals refer to similar parts throughout the drawings.

Figure 1:
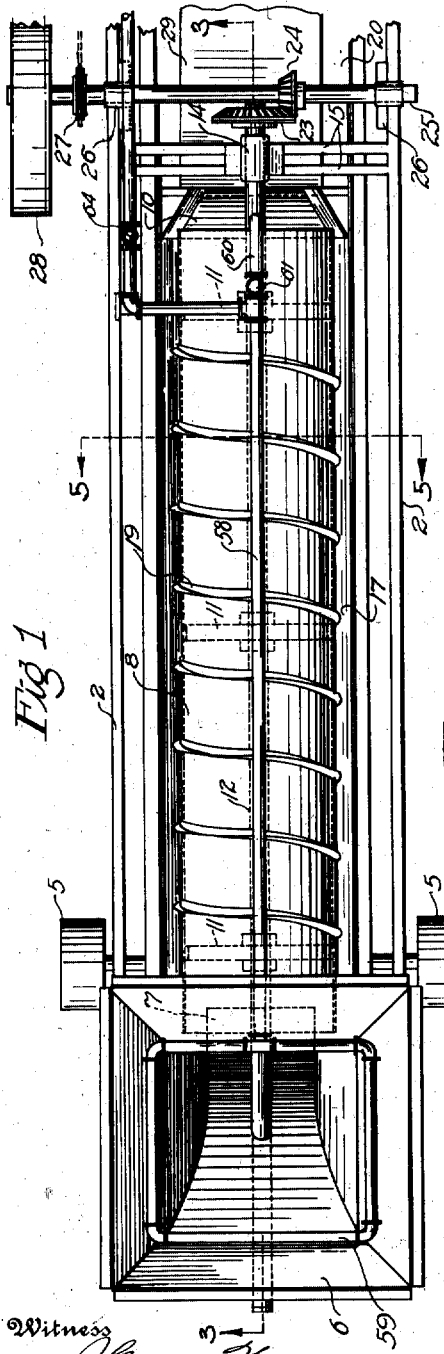
Figures 1 and 2 are plan views of each end of the apparatus.
Figure 2:
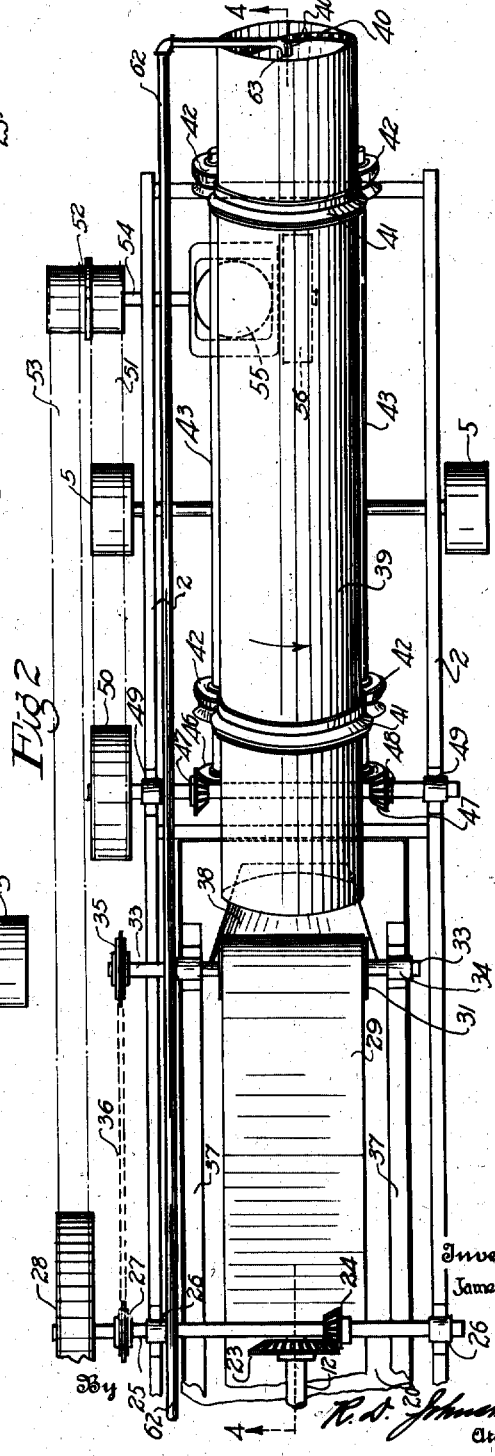

My present invention, as illustrated, is shown mounted upon a steel frame work comprising a lower channel iron frame 1 and an upper channel iron frame 2, which frames are connected by uprights 3 and cross braced by bars 4 to form a light low rigid structure which is made portable by being mounted upon wheels 5. A rectangular hopper 6 is suitably mounted on the frame work at its forward end, its top level being preferably at a height to permit the convenient delivery of material thereinto by hand or from a steam shovel. The hopper bottom is provided with an annular side discharge orifice 7 which sets partially below the level of the upper frame 2 and is adapted to discharge the material from the hopper into a cylindrical perforated screen 8 having an outer ring head 9 which surrounds the discharge end of the hopper. The screen is left open at its outer rear end so as to deliver the lumps and coarse material to a chute 10. The screen is disposed substantially horizontally and is mounted by means of a plurality of spiders 11 on a center shaft 12, which at its rear end projects beyond the screen and at its forward end projects through and beyond the hopper. This shaft is adapted for rotation in the forward bearing 13 and in a rear bearing 14 mounted on transverse I-beams 15 in the upper frame. The screen is provided internally with a series of longitudinal ribs 16 which are given a spiral twist at their forward ends only so as to effect a positive but gradual feed of the material lengthwise through the screen. The ribs lift and drop the material and thus break up the lumps of clay. The screen works in a semi-circular trough 17 suitably connected to the frame and having its forward end 18 cut away to receive the lower part of the hopper. I mount a spiral screw feed rib 19 around the outer surface of the screen 8, which rib is adapted to force the sludge lengthwise of the trough and discharge it into a sludge tank 20 that is underhung or set low in the frame work and provided with a bottom outlet pipe 21 controlled by a valve 22. I mount a beveled gear 23 on the rear end of the shaft 12 and drive this gear by means of a small beveled gear 24 on a cross shaft 25 mounted in suitable bearings 26 on the upper frame 2 and having on its outer end a sprocket 27 and a pulley wheel 28.

After the ore or other material has been screened and relieved of most of its sludge and fine clay, it is delivered from the chute 10 onto a picking belt 29 which passes around rolls 30 and 31 mounted on cross shafts 32 and 33 respectively. The shaft 32 is journaled in the side walls of the sludge tank so as to bring the lower end of the belt below the chute 10, while the upper shaft 33 is mounted upon raised bearings 34 above the frame 2. A sprocket wheel 35 on the shaft 33 is driven by means of a chain 36 from the sprocket 27 on the main drive shaft 25. Angle irons 37 are riveted to the sides of the tank and extend to the upper bearings 34 to brace the latter. The picked material is discharged from the belt through an inclined chute 38 into the lower end of a drum washer 39 having an internal continuous spiral rib 40 and external tires 41. These tires rest on grooved wheels 42 mounted fixedly on a pair of parallel shafts 43, which are supported at a suitable incline on the pillow blocks 44. The upper pillow blocks are mounted upon upright brackets 45 attached to the rear end of the frame 2. The shafts 43 at their lower ends carry beveled gears 46, each of which meshes with a beveled gear 47 on a cross shaft 48 supported in suitable bearings 49 on the frame 2 and having at its outer end a pulley 50, which, by means of a belt 51, is driven by a double pulley 52 which also drives a belt 53 leading to the pulley 28. The double pulley 52 is mounted upon a main power shaft 54 which is driven by a gasolene motor 55 mounted on the lower frame 1 near the rear end thereof. The fly wheel 56 is mounted on the inner end of the draft sheet 54. Water is supplied to the apparatus by means of a pipe or hose line leading to a suitable source of supply, said line having connected with it an upright pipe 57, which at its upper end connects with a spray pipe 58 disposed longitudinally and centrally above the screen 8 and connecting with a spray pipe 59 disposed about the inner surface of the hopper 6. A pipe 60 leads from pipe 57 into the discharge end of the screen and has its nozzle disposed to deliver a strong spray of water downwardly and inwardly so as to both wash the lump material and retard its discharge from the screen. A valve 61 is provided to regulate the strength of the stream. A pipe 62, also connected with the water supply, leads upwardly from the rear end of the frame and has its upper end bent over and inwardly and terminating in a nozzle 63 which discharges the water into the upper outer end of the drum washer 39. The final convolution of the feed rib 40 at the upper or discharge end of the drum washer is provided with perforations 40ª to permit the water to pass therethrough and not be discharged in any appreciable quantity by the screw feed of the rib. I provide a valve 64 in pipe 62 and locate it near the picking belt so that the operator there can control the volume of water sprayed by pipes 60 and 62 on the ore and regulate it according to whether the run of ore is clean or dirty. If desirable, suitable driving connections, such as a chain drive 63 and a sprocket 64, may be provided from the motor to the wheels 5.

Figure 4:
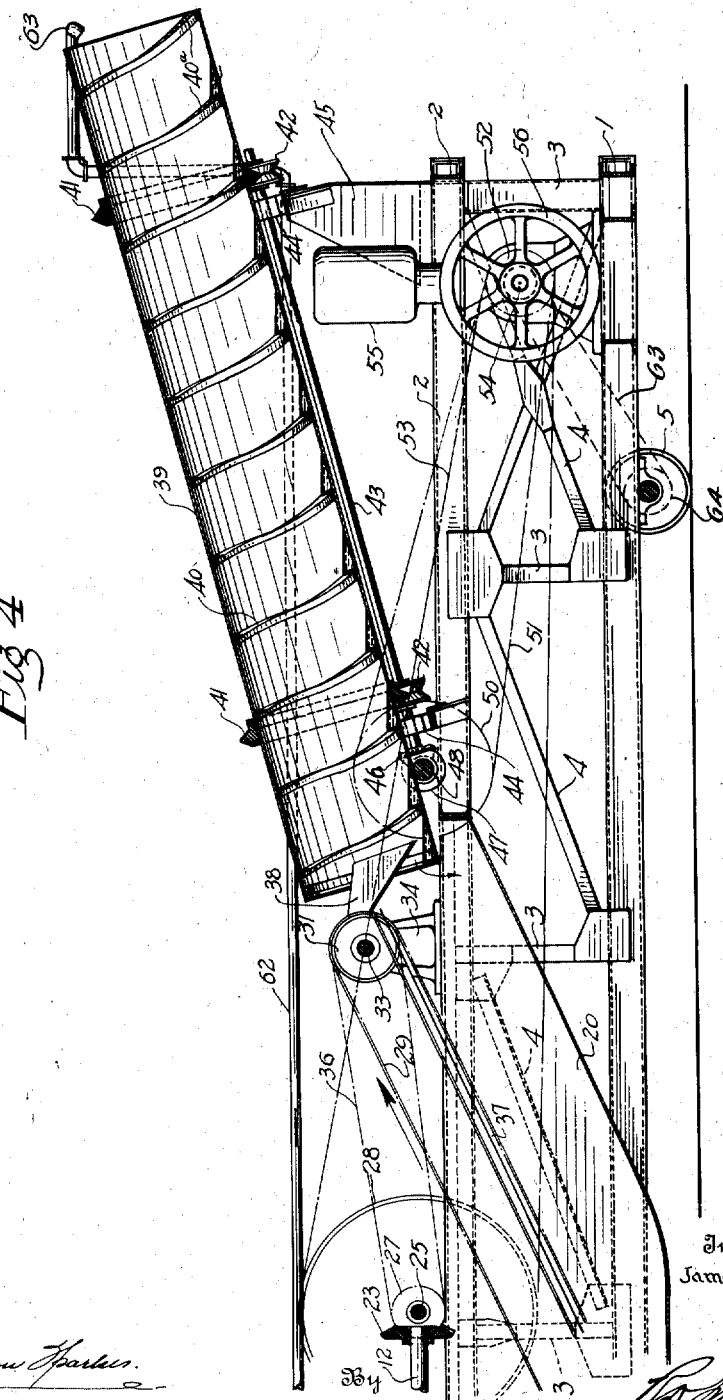
Fig. 4 is a vertical sectional view on the line 4—4 of Fig. 2.

In operation, the material is delivered into the hopper 6 and is there acted upon by the water sprayed from the pipe 59 and delivered into the inner end of the rotating screen 8 which has small diameter openings preferably one-eighth inch so that only the sludge and very fine material will escape therethrough into the trough 17. This escape is aided by the continuous spraying of the screen by water jets from the pipe 58 and by the spray pipe 60. The screw rib 19 will positively force the discharge of sludge from the trough into the sludge tank 70 and the arrangement of the ends of the ribs 16 within the screen is sufficient to cause a positive but slow feed of the material therethrough which is worked by the ribs and the sprays of water so as to effectively eliminate most of the mud and dirt from the ore. The lump ore and the clay lumps then fall onto the picking belt 29 and are raised slowly by the latter during which time the picking operation takes place and the rock, refuse and large clay lumps are thrown off. The ore and small clay lumps are finally discharged through the chute 38 into the lower end of the rotating drum washer 39 and are there acted upon by the screw feed rib 40 and the rotation of the drum to work them with a rolling action against the flow of water until the ore is discharged in a clean condition from the upper end of the drum washer. One important advantage of the continuous screw feed rib in the rotating drum washer is that the material is advanced by a rolling action thereof, causing it to form into balls which, being lighter than ore, will work to the top of the shifting body of ore and will roll down to the inclined drum walls and be caught by the concentrated flow of water along the bottom of the drum and rolled or carried along over the convolutions of the ribs until ultimately discharged from the lower end of the drum washer into the rear end of the sludge tank which, as will be seen in Fig. 4, extends under and beyond the picking belt and the inner end of the screen trough. This rolling action of the mud permits it to be carried off with a very light flow of water and by reason of this as well as because the continuous spiral rib protects the fine ore from the direct washing action of the water, I avoid loss of the fine ore. The picking belt operator is in complete control of the plant and he can so effectively regulate the water as to obtain the desired washing of the ore, for he can by spray 60 retard or increase the discharge from the screen and by increasing the flow of water through the drum washer he can eliminate any desired amount of clay therein.

Obviously, many advantages of my invention would result from the use of any well known type of screw feed means in the drum washer, and even if an ordinary log washer were substituted by my improved internal feed washing drum in the combination shown, its efficiency would be greatly increased. I have disclosed herein the broader principles upon which my washing plant is designed and it is understood that the several elements thereof can be variously modified and rearranged within the scope and purposes of my invention.

Having thus described my invention, what I claim as new and desire to secure by Letters Patents, is:—

1. In a washing apparatus, a sludge tank, a conveyer disposed over the tank and adapted to raise the material delivered thereto, a substantially horizontally disposed screening washer adapted to deliver the screened material onto said conveyer and the sludge into said tank, and a drum washer adapted to receive, elevate and discharge the material which said conveyer is adapted to deliver into its lower end, said drum washer being adapted to drain into said sludge tank which is disposed between the said two washers, substantially as described.

2. A washing apparatus comprising in combination and in longitudinal alinement a hopper, a rotatable screen washer, a picking belt to receive the washed material from the screen, an inclined rotatable drum washer to receive the picked material from said belt, and a sludge tank for both washers disposed beneath the picking belt, substantially as described.

3. In a portable washing apparatus, in combination, a frame having at one end a hopper set low to receive material from hand or steam shovels, a substantially horizontal rotatable screen into which said hopper discharges the material to be treated, a trough under the screen, spiral feed means carried by the screen and adapted to force the movement of the sludge along said trough, a sludge tank into which said trough discharges, a picking belt having one end disposed in the sludge tank in position to receive the screened material, and a hollow rolling washing drum overhanging the sludge tank into which said picking belt delivers the picked material, substantially as described.

4. In a portable washer, a frame, a substantially horizontal screen washer at one end of said frame, a sludge conveyer trough under the screen washer, an underhung sludge tank at an intermediate point in said frame into which said trough drains, and an inclined internal feed drum washer at the other end of said frame and having its lower end disposed to drain into the sludge tank and its outer end raised to an elevation from which the material will fall into cars and means to deliver the screened material from the screen washer into the lower end of the drum washer, substantially as described.

5. In a washing apparatus, an intermediate sludge tank, a picking belt disposed at an incline in said tank, a screening washer adapted to deliver the screened material onto said belt and the sludge into said tank, and a drum washer adapted to receive, elevate and discharge the material from the upper end of said belt and adapted to drain into the sludge tank below said belt, substantially as described.

6. In a washing apparatus, an intermediate sludge tank, a picking belt disposed at an incline in said tank, a screening washer adapted to deliver the screened material onto said belt and the sludge into said tank, a drum washer adapted to receive, elevate and discharge the material from the upper end of said belt and adapted to drain into the sludge tank below said belt, and means to control the water supply to both washers from a point adjacent to said picking belt.

In testimony whereof I affix my signature.

JAMES P. DOVEL.

Witness:
Nomie Welsh.